United States Patent [19]

Ishikura

[11] Patent Number: 5,317,244

[45] Date of Patent: May 31, 1994

[54] MOTOR CONTROL UNIT PROVIDED WITH ANTI-BURNING DEVICE

[75] Inventor: Takuro Ishikura, Kashihara, Japan

[73] Assignee: Sharp Kabushiki Kaisha, Osaka, Japan

[21] Appl. No.: 924,618

[22] Filed: Aug. 6, 1992

Related U.S. Application Data

[63] Continuation of Ser. No. 685,988, Apr. 15, 1991, abandoned, which is a continuation of Ser. No. 330,467, Mar. 30, 1989, abandoned.

[30] Foreign Application Priority Data

Mar. 31, 1988 [JP] Japan ................... 63-80615

[51] Int. Cl.$^5$ ................................ H02P 6/02
[52] U.S. Cl. ................... 318/254; 318/138
[58] Field of Search ............ 318/256, 254 A, 138, 318/434

[56] References Cited

U.S. PATENT DOCUMENTS

| 2,629,951 | 12/1986 | Weber et al. | 318/434 |
|---|---|---|---|
| 4,119,895 | 7/1988 | Ban | 318/254 |
| 4,473,782 | 9/1984 | Reinhardt et al. | 318/254 |
| 4,578,623 | 3/1986 | Tsukutani et al. | 318/256 |
| 4,583,028 | 4/1986 | Angersbach | 318/254 |
| 4,712,053 | 12/1987 | Numata | 318/434 |
| 4,734,627 | 3/1988 | Koerner | 318/254 |
| 4,748,386 | 5/1988 | Nakanishi et al. | 318/434 |
| 4,760,316 | 7/1988 | Hedlund | 318/434 |
| 4,832,576 | 5/1989 | Deguchi et al. | 318/254 |
| 5,001,406 | 3/1991 | Peterson | 318/254 |

Primary Examiner—Bernard Roskoski

[57] ABSTRACT

A motor control unit having an anti-burning device is provided which includes a rotation detection device for detecting whether the rotational speed of a given motor is below a predetermined level, a power supply limiting device for limiting the time of supplying current to the motor according to its rotational speed when the speed has been detected by the rotation speed detection device to be below the predetermined level. Thereby, the motor is prevented from burning, deteriorating in performance or shortening in life when the motor is overloaded. Also, the rotation detection device detects the condition when the motor is not rotating, and a cyclic power supply device for supplying current at a given cycle when the motor has been found to be not rotating by the aforementioned rotation detection device. Thereby, if the motor has been locked under an overload condition the motor can be readily restarted automatically when the load has been relieved.

14 Claims, 3 Drawing Sheets (a) VOLTAGE $V_c$ ACROSS CAPACITOR $C_1$ (UNDER OVERLOAD)

(b) OUTPUT SIGNAL FROM COMPARATOR 29 (UNDER OVERLOAD)

(a) VOLTAGE $V_c$ ACROSS CAPACITOR $C_1$ (AT MOTOR 11 BEING LOCKED)

(b) OUTPUT SIGNAL FROM COMPARATOR 29 (AT MOTOR 11 BEING LOCKED)

MOTOR CONTROL UNIT PROVIDED WITH ANTI-BURNING DEVICE

This application is a continuation of application Ser. No. 07/685,988 filed on Apr. 15, 1991, now abandoned; which is a continuation of Ser. No. 07/330,467 filed on Mar. 30, 1989, now abandoned.

FIELD OF THE INVENTION

The present invention relates to a motor control unit in particular, to a motor control unit provided with an anti-burning device to ensure against burning of the motor coil or a similar element due to an overcurrent resulting from overloading of the motor.

BACKGROUND OF THE INVENTION

In conventional motor control units, for instance, as disclosed in Japanese Laid-Open Patent Application No. 280751/'86, a unit which generates a rotating magnetic field through repetitive energizations of the exciting coil and interruptions thereof by timing a transistor ON/OFF is known for starting or otherwise controlling a motor.

When a motor is overloaded, its speed will be lowered until it eventually locks. Then, the exciting coil of the motor is subjected to a current approximately three times greater than the current supplied when the motor is running under a normal load. This results in undue heating of the motor which causes the motor to burn, deteriorate, shorten in life and other similar malfunctions.

Therefore, a motor control unit provided with an anti-burning device has been used which, for instance, detects the temperatures of semiconductors constituting a control circuit. When the temperature of such semiconductors have risen above a preset temperature, the supply of current to the motor is stopped.

Furthermore, various motors used as power source have different resistance values of the exciting coil according to the rated voltage and the torque generated. Hence, the amount of current flowing through the exciting coil is different. Even with motors having the same amount of current flowing under an overloaded condition varies according to differences in the resistances of the exciting coils, environmental conditions, etc.

However, a motor control unit provided with a conventional anti-burning device, as mentioned above, is arranged so that the current supply to the motor is stopped upon detecting a rise in temperature of the semiconductor elements constituting the control circuit. Hence, with a motor having a relatively high amount of working current, it is possible for the anti-burning device to stop the supply of current to the motor even if the load on the motor is not extremely large.

Meanwhile, in a motor having a relatively low amount of current flowing even when it is overloaded, it is possible that the temperature of the semiconductor elements constituting the control circuit may not reach the preset temperature even if the motor is overloaded. In such a case, the anti-burning device may fail to act or act too late which may result in a failure to ensure the motor against burning, deteriorating, shortening in working life, etc.

To cope with this problem it is possible to modify the detection sensitivity and detect the rise in temperature of the control circuit according to the type of the motor to be controlled, but this is bound to result in the loss of the general purpose features of such a motor control unit.

In another function required for this kind of motor control unit, after the current supply to the motor is stopped by actuation of the anti-burning device, it is necessary to resume the current supply when the load on the motor has been relieved. In such a case, as mentioned above, it is possible that an anti-burning device for stopping the current supply to the motor through the detection of a rise in temperature of the semiconductors constituting the control circuit. It is conceivable to resume the current supply to the motor after stopping the current supply to the motor, the temperatures of the semiconductor drop below the predetermined temperature.

However, even if the load is relieved immediately after stopping the power supply to the motor, a relatively long amount of time is required before the temperature of the control circuit is lowered and the current supply is resumed. Also, the amount of time until the power supply resumes will vary depending on the environmental conditions such as the atmospheric temperature. Even when power supply is resumed, if the overload condition remains, it means that the overcurrent will continue to blow until the temperature of the control circuit increases and actuates the anti-burning device, which may cause a deterioration in performance and a shortening in life of the motor.

SUMMARY OF THE INVENTION

It is a primary object of the present invention to provide a motor control unit having an anti-burning device which prevents the motor from heating by an overcurrent condition when the motor is overloaded, so that burning, deteriorating, shortening in life and similar malfunction of the motor do not occur. A particular object of the invention is to provide a motor control unit having an anti-burning device capable of preventing the motor from burning through a secure detection of the overloaded condition even when the motors controlled thereby have different exciting coil resistances or different amounts of current flowing through the exciting coil when the motors are overloaded.

Another object of the present invention is to provide a motor control unit having an anti-burning device which is capable of automatically and readily restarting after the load has been relieved even when the motor controlled has been locked as a result of the overloading.

Still another object of the present invention is to provide a compact and highly reliable motor control unit of a simplified composition having a few elements and an anti-burning device where the important elements are integrated on a semiconductor chip.

In order to accomplish the aforementioned objects, the motor control unit of the present invention includes a rotation detection device for detecting whether the rotational speed of a given motor is below a predetermined level and when the motion is not rotation a power supply limiting device for limiting the time in which current is supplied to the motor according to its rotational speed when the rotation detection device detects that the speed of the motor is below the predetermined level, and a cyclic power supply device for supplying current at a given cycle when the motor has been detected as not rotating by the aforementioned rotation stop detection device.

The control unit having the aforementioned anti-burning device for the motor includes a power supply control circuit combining the functions of the aforementioned rotation detection device, the power supply limiting device, and the cyclic power supply device. This power supply control circuit may, for instance, include a capacitor, a current supply device which supplies current to charge the capacitor, a rotational speed detection device for outputting negative logical pulse signals at a timing which corresponds to the rotation cycle of the magnet rotor for the motor, a discharging circuit which discharges the electric charge accumulated in the capacitor when the difference between the output potential difference of the rotational speed detection device and the potential difference across the capacitor becomes greater than the predetermined value, and a comparator which causes the power supply for the exciting coil of the motor to be stopped upon the detection of the potential difference between both ends of the capacitor becomes greater than the predetermined value.

The rotational speed detection device having the aforementioned power supply control circuit may, for instance, include a rotational position detection device which outputs high level and/or low level signals according to the rotational position of the magnet rotor for the motor, and a pulse generation device which outputs negative logical pulse signals when the output level of the rotational position detecting device has been varied.

The rotational position detection device having the aforementioned rotational speed detection device may as also include a hall element so that the rotational speed of the motor can be detected through detection of the magnetic force of the magnet rotor for the motor by the aforementioned hall element.

Also, the rotational position detection device having the aforementioned rotational speed detection device may also include a detection coil so that the detection of the rotational speed of the motor can be detected through detection of the magnetic force of the magnetic rotor for the motor by the aforementioned detection coil.

The rotational position detection device having the aforementioned rotational speed detection device may also include a voltage detection device so that the rotational speed of the motor can be detected through detection of the kick-back voltage of the stator exciting coil for the motor by the aforementioned voltage detection device.

Meanwhile, a pulse generating device having the aforementioned rotational speed detection device may also include a NOT circuit which inverts the level of the output signal from the rotational position detection device and delays the output signal at the same time by a predetermined length of time and an OR circuit which determines the logical sum of the output signal from the NOT circuit and the output signal of the aforementioned rotational position detecting device.

Furthermore, the current supply device having the aforementioned power supply control circuit may also include a constant current circuit or may be arranged so that the maximum current is limited by resistors connected in series to the power source.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE EMBODIMENTS

An example of a control unit having an anti-burning device for controlling a 2-phase half-wave motor is described below for an embodiment of the present invention with reference being made to FIGS. 1-4.

Figure 1:
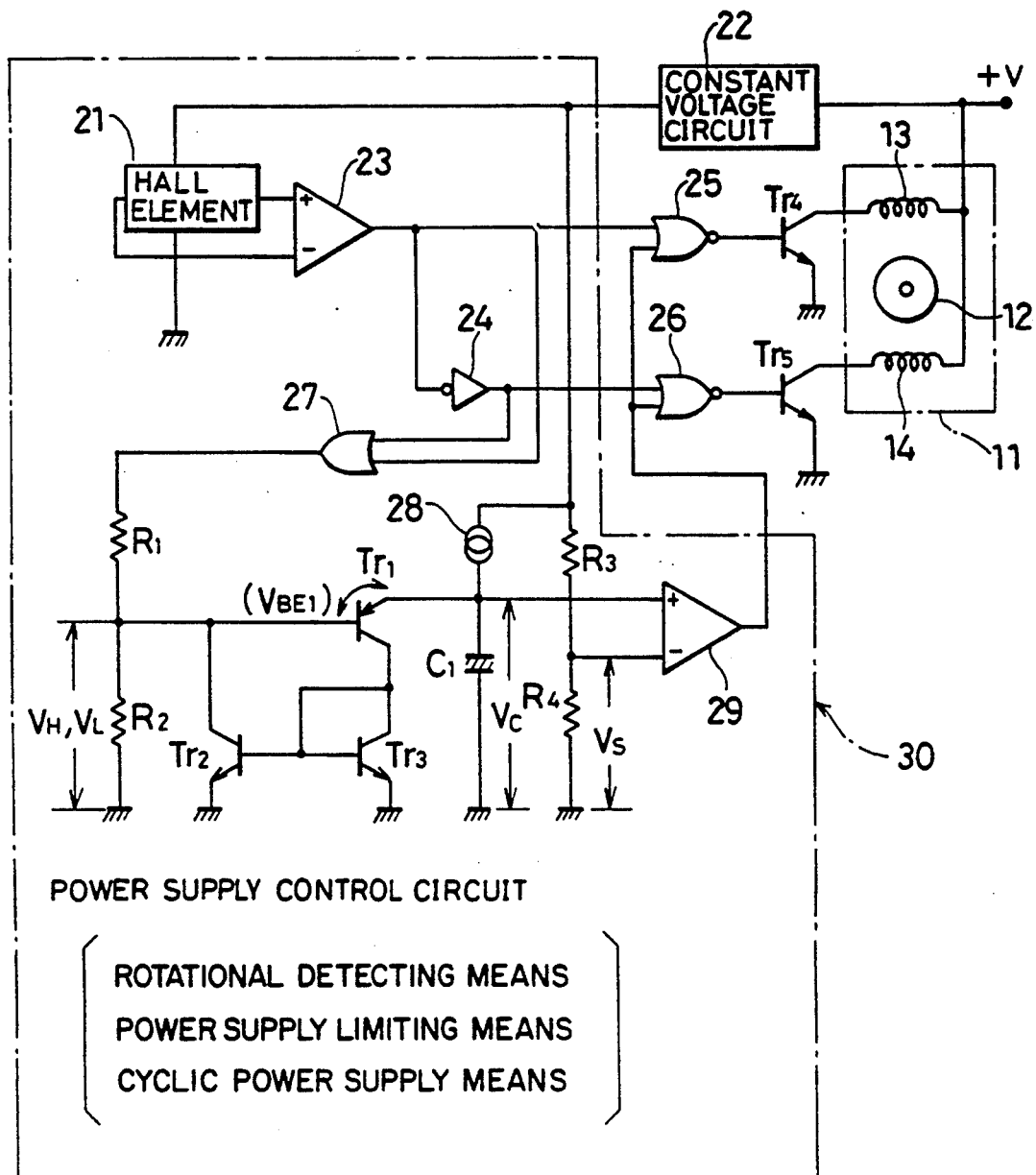
FIG. 1 is a circuit diagram showing the composition of an embodiment of a 2-phase half-wave motor and a control unit of the present invention for starting and otherwise controlling the operation thereof.
Figure 2:
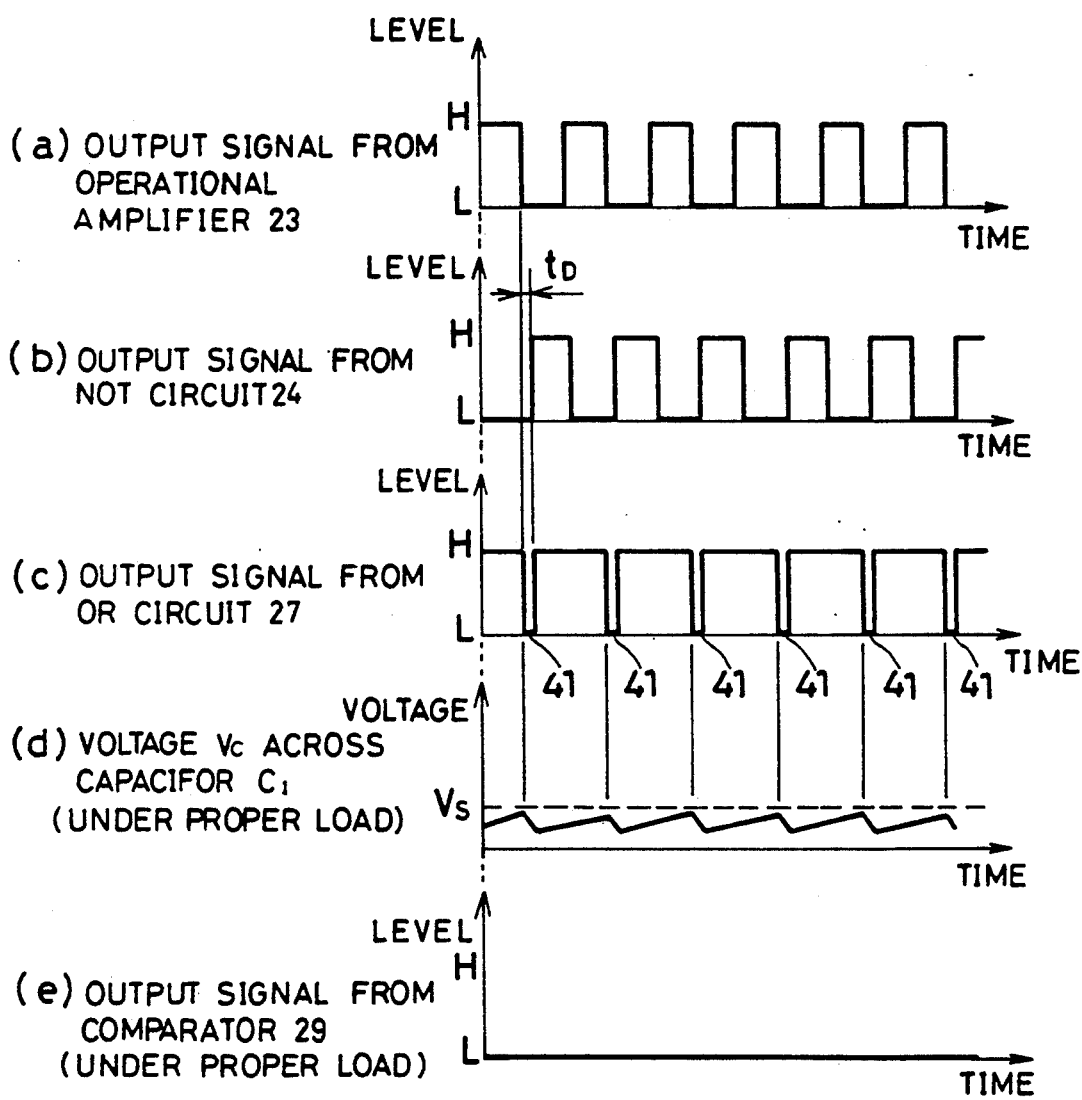
FIG. 2 is a time chart showing the way a power supply control circuit acts when a proper load is applied to the 2-phase half-wave motor.
Figure 3:
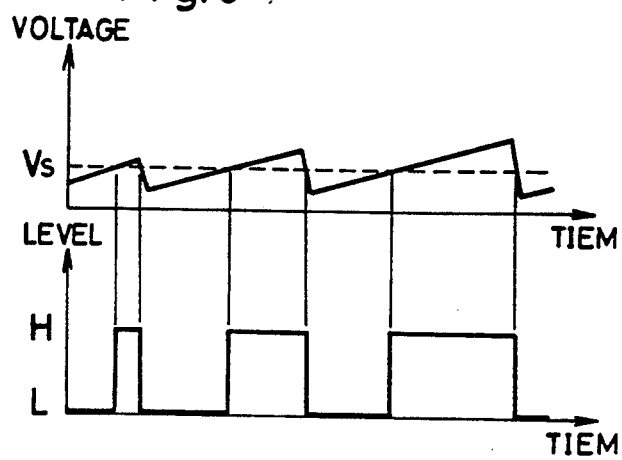
FIG. 3 is another time chart showing the way the power supply control circuit acts when the 2-phase half-wave motor is subjected to an overload.
Figure 4:
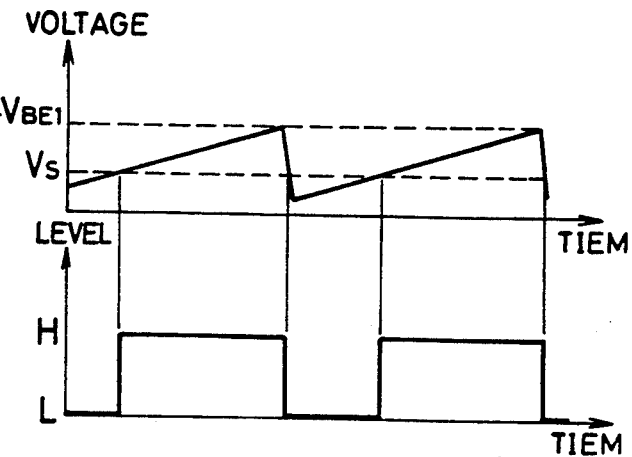
FIG. 4 is still another time chart showing the way the power supply control circuit acts when the 2-phase half-wave motor is locked.

A 2-phase half-wave motor 11, as shown in FIG. 1, includes a freely rotatable magnet rotor 12 with a plurality of magnetic poles formed along its outer periphery, and stator exciting coils 13 and 14 arranged on both sides of the magnet rotor 12.

A hall element 21 for detecting the rotational position of the magnet rotor 12 by the aid of the magnetic force of the aforementioned magnet rotor 12 has two input terminals one input terminal is connected to a power source +V through a constant voltage circuit 22 and the other input terminal is grounded. The one output terminal of the hall element 21 is connected to the input terminal of the positive side of an operational amplifier 23, and the other input terminal is connected to the input terminal on the minus side thereof.

The output terminal of the operational amplifier 23 is connected directly to a NOR circuit 25 and to another NOR circuit 26 through a NOT circuit 24. The aforementioned operational amplifier 23 and the NOT circuit 24 are also connected to an OR circuit 27.

The output terminal of the OR circuit 27 is grounded through a resistor $R_1$ and another resistor $R_2$ so that the voltage divided by the resistors $R_1$ and $R_2$ is applied to the base of the transistor $Tr_1$. The aforementioned hall element 21, the operational amplifier 23, the NOT circuit 24, the OR circuit 27 and the resistors $R_1$, and $R_2$ constitute a rotation detection device which outputs negative logical pulses for a timing which corresponds to the rotation period of the magnet rotor 12 of the 2-phase half-wave motor 11.

The hall element 21 acts as a rotational position detecting device for outputting high level and low level signals according to the rotational position of the magnet rotor 12 of the 2-phase half-wave motor 11. Also, a pulse generating device is formed with the operational amplifier 23, the NOT circuit 24, the OR circuit 27 and the resistors $R_1$, and $R_2$ for putting negative logical pulse signals when the output level of the rotational position detection device varies.

The base of the transistor $Tr_1$, which is connected to both resistors $R_1$ and $R_2$, is grounded through the collector and the emitter of another transistor $Tr_2$, while the collector of the transistor $Tr_1$ is grounded through the collector and the emitter of still another transistor $Tr_3$. The base of the transistor $Tr_2$ is connected with the base of the transistor $Tr_3$, which are also connected with the collector of the transistor $Tr_1$.

The emitter of the aforementioned transistor $Tr_1$ has one end of the capacitor $C_1$ connected thereto and the other end grounded. A discharge circuit is formed by the aforementioned transistors $Tr_1$–$Tr_3$, and the electric charge accumulated in the capacitor $C_1$ is discharged when the potential of the ungrounded end of the capacitor $C_1$ exceeds the potential at the connection of the resistors $R_1$ and $R_2$ by the predetermined level.

The ungrounded end of the capacitor $C_1$ is also connected to a constant voltage circuit 22 through a constant current circuit 28 which serves as a current supply device so that supplying current to the capacitor $C_1$ for an electric charge may be built up. Furthermore, the ungrounded end of the capacitor $C_1$ is connected to the input terminal on the positive side of a comparator 29 which stops the supply of power to the stator exciting coils 13 and 14 of the 2-phase half-wave motor 11 after a rise in the potential of the ungrounded end is detected to be above the predetermined level. On the negative terminal of the comparator 29, the voltage resulting from a division by resistors $R_3$ and $R_4$ from the output voltage of a constant voltage circuit 22 is applied as a reference voltage $V_S$.

The output terminal of the comparator 29 is connected to NOR circuits 25 and 26 as well as the aforementioned operational amplifier 23 and NOR circuit 24. The output terminals of the NOR terminals 25 and 26 are connected to the base of transistors $Tr_4$ and $Tr_5$. The emitters of the transistors $Tr_4$ and $Tr_5$ are both grounded, while their collectors are connected to one end of the stator exciting coils 13 and 14. The other ends of the stator exciting coils 13 and 14 are connected to the power source $+V$.

The aforementioned hall element 21, operational amplifier 23, the NOT circuit 24, the OR circuit 27, the constant current circuit 28, the comparator 29, the resistors $R_1$–$R_4$, the transistors $Tr_1$–$Tr_3$ and the capacitor $C_1$ comprise a power supply control circuit 30 for the 2-phase half-wave motor 11. This power supply control circuit 30 outputs power supply control signals for generating rotating magnetic fields in the stator exciting coils 13 and 14 which also acts as the rotation detecting device for detecting the rotational speed and the stoppage of the 2-phase half-wave motor 11. A power supply limiting device limits the duration of the power supply to the 2-phase half-wave motor 11 according to the rotational speed when the rotational speed of the motor has been detected to be less than the predetermined limit, and a cyclic power supply device supplies power at a given cycle when a stoppage of the rotation for the 2-phase half-wave motor 11 by the rotation detection device has been detected, so that the devices act as an anti-burning device.

In the composition described above, the hall element 21 is subjected to an alternate magnetic field, when the magnet rotor 12 of the 2-phase half-wave motor 11 is rotating. Hence, as shown in FIG. 2(a), the operational amplifier 23 outputs signals for alternatively and periodically repeats high level and low level signals. Meanwhile, the NOT circuit 24, as shown in FIG. 2(b), generates the output signal from the operational amplifier 23 in an inverted form to be outputted and delayed by the delay time $t_D$.

As shown in FIG. 2(c), the negative logical pulses 41 are synchronized with the timing for the switching of the output signal from the operational amplifier 23 from the high level to the low level. The levels of the negative logical pulses 41 become lower by a value equivalent to the delay time $t_D$ of the aforementioned NOT circuit 24 outputted from the OR circuit 27.

With the voltage of the resistors $R_1$ and $R_2$ when the logical pulses 41 are not outputted from the OR circuit 27 as $V_H$, the diffusion potential between the emitter and the base of the transistor $Tr_1$ as $V_{BE1}$ and the voltage across the capacitor $C_1$ as $V_C$, current does not flow from the emitter to the base of the transistor $Tr_1$ when:

$$V_H + V_{BE1} > V_C,$$

hence the transistor $Tr_1$ is turned OFF along with the transistors $Tr_2$ and $Tr_3$. Thereby, the capacitor $C_1$ is charged by the current from the constant current circuit 28 and, as shown in FIG. 2(d), the voltage $V_C$ across the capacitor $C_1$ rises gradually.

Meanwhile, when the negative pulses 41 from the OR circuit 27 are outputted and $$V_L + V_{BE1} < V_C$$

(where $V_L$ is the voltage of the resistors $R_1$ and $R_2$), the transistor $Tr_1$ turns ON. Since the current, which flows from the emitter to the collector of the transistor $Tr_1$, also flows from the base to the emitter of the transistors $Tr_2$ and $Tr_3$, the transistors $Tr_2$ and $Tr_3$ are both turned ON. In this case, even if the output signal from the OR circuit 27 should be restored to the high level, current continues flow from the emitter to the base of the transistor $Tr_1$, and from the collector through the emitter of the transistor $Tr_2$, so that transistors $Tr_1$–$Tr_3$ are all turned ON. Thereby, the electric charge accumulated in the capacitor $C_1$ is discharged through the emitter to the collector of the transistor $Tr_1$ and the collector to the emitter of the transistor $Tr_3$.

As the voltage across the capacitor $C_1$ becomes lower as a result of the aforementioned discharge, the transistors $Tr_1$–$Tr_3$ are both turned OFF, and the capacitor $C_1$ again starts to charge.

Thus, the negative logical pulses 41 from the OR circuit 27 are synchronized with a repetition of the discharging from and the recharging of the capacitor $C_1$. The maximum voltage occurring across the capacitor $C_1$, that is, the voltage immediately before the discharge start from the capacitor $C_1$, is determined by the cycle of the negative logical pulses 41, namely the rotational speed of the 2-phase half-wave motor 11.

If the reference voltage $V_S$ applied to the negative side terminal of the comparator 29 is set to be higher than the maximum voltage generated across the capacitor $C_1$ when the 2-phase half-wave motor 11 is operating under a proper load, the comparator 29 continues outputting low level signals as shown in FIG. 2(e).

As the comparator 29 continues outputting the low level signals, the NOR circuits 25 and 26 alternately output the high level signals each time the low level signal is transmitted from the operational amplifier 23 and the NOT circuit 24. By the high level signals from the NOR circuits 25 and 26, the transistors $Tr_4$ and $Tr_5$ are turned ON and since the stator exciting coils 13 and 14 are energized alternately to generate a rotating magnetic field, the magnet rotor 12 continues rotating.

As the 2-phase half-wave motor 11 is overloaded to lower the rotational speed of the half-wave motor 11, the cycle of the negative logical pulses 41 and the cycle of the discharge from the capacitor $C_1$ become longer and the maximum voltage across the capacitor $C_1$ becomes higher.

When, the reference voltage $V_S$ is so set that, as shown in FIG. 3(a), for instance, the maximum voltage built up across the capacitor $C_1$ is higher than the reference voltage $V_S$ applied to the negative terminal of the comparator 29. When the 2-phase half-wave motor 11 is overloaded to lower the rotational speed, the comparator 29 outputs the high level signals during the length of time according to the degree of overload, as shown in FIG. 3(b).

While the high level signals are being outputted from the comparator 29, the NOR circuits 25 and 26 both continue outputting low level signals regardless of the levels of output signals from the operational amplifier 23 and the NOT circuit 24. The transistors $Tr_4$ and $Tr_5$ are, therefore, turned off OFF, and the power supply to the exciting coils 13 and 14 of the stator is limited.

That is, when the 2-phase half-wave motor 11 is overloaded to cause lowering or the rotational speed of the 2-phase half-wave motor 11 to such an extent that an overcurrent flows through the stator exciting coils 13 and 14. The power supply to the stator exciting coils 13 and 14 is limited according to the degree that the rotational speed is lowered. Thereby, heating of the 2-phase half-wave motor 11 is prevented and burning of the exciting coils 13, 14 of the stator and shortening of the life of the core (not shown) due to deterioration, changing in quality and other malfunctions do not occur.

Meanwhile, when the 2-phase half-wave motor 11 is subjected to a more excessive load to be eventually locked, the output signal from the hall element 21 ceases to change, and either of the output signals from the operational amplifier 23 or the NOT circuit 24 will always be kept at a high level. Therefore, like when the negative logical pulses 41 are not outputted from the OR circuit 27 with the aforementioned 2-phase half-wave motor 11 running and the relationship among the voltage $V_H$ of the resistors $R_1$ and $R_2$, the diffusion potential $V_{BE1}$ between the emitter and the base of the transistor $Tr_1$, and the voltage $V_C$ across the capacitor $C_1$ is represented by the formula $$V_H + V_{BE1} > V_C,$$

the transistors $Tr_1$-$Tr_3$ are turned OFF, the capacitor $C_1$ is charged with the current flowing from the constant current circuit 28, and the voltage across $C_1$ rises gradually, as shown in FIG. 4(a).

With the maximum voltage which the constant current circuit 28 can output as $V_O$, the condition represented by the formula $$V_H + V_{BE1} < V_C$$

is reached in time with progressive charging of the capacitor $C_1$, when the resistance values of resistors $R_1$ and $R_2$ set to satisfy the formula $$V_H + V_{BE1} < V_O.$$

Then, in the case where the negative logical pulses 41 are outputted from the aforementioned OR circuit 27, the transistors $Tr_1$-$Tr_3$ are turned ON, and the electric charge accumulated in the capacitor $C_1$ is discharged. As the voltage $V_C$ across the capacitor $C_1$ becomes lower with progressive discharging, the transistors $Tr_1$-$Tr_3$ are turned OFF and recharging of the capacitor $C_1$ is started.

The cycle of such charging and discharging of the capacitor $C_1$ can be set freely through adjustments of the capacitor $C_1$ as well as the amount of current from the constant current circuit 28.

While the voltage $V_C$ across the capacitor $C_1$ after discharge of the capacitor $C_1$ remains lower than the reference voltage $V_S$ applied to the negative of the comparator 29, the comparator 29 continues outputting low level signals, as shown in FIG. 4(b). Therefore, either of the NOR circuits 25 or 26 outputs high level signals according to the output signals from the operational amplifier 23 or the NOT circuit 24, and the stator exciting coils 13 or 14 is energized thereby.

If the excessive load applied to the 2-phase half-wave motor 11 has by then been relieved, the magnet rotor 12 resumes rotation due to the rotating force created by the magnetic force generated by the stator exciting coil 13 or 14.

When, on the other hand, the excessive load applied to the 2-phase half-wave motor 11 remains unaltered, the power supply to the stator exciting coil 13 and 14 is stopped when the voltage $V_C$ across the capacitor $C_1$ has in time exceeded the reference voltage $V_S$ of the comparator 29. This reference voltage $V_S$ can be set freely by resistors $R_3$ $R_4$. Accordingly, the duration of the power supply to the 2-phase half-wave motor 11 can also be set freely.

If the duration of the power supply to the 2-phase half-wave motor 11 should be properly set, heating of the 2-phase half-wave motor 11 can be prevented or controlled securely. Therefore, an effective way is provided for preventing burning of the stator exciting coil 13 and 14 or shortening of the life due to deterioration, change in quality, and other malfunctions of the core (not shown).

Also, in the composition described above the entire circuit except the capacitor $C_1$ can be easily integrated in a semiconductor chip. Thereby, a motor control unit provided with a compact anti-burning device may be obtained.

Although in this embodiment, an example is provided for detecting the rotational position of the magnet rotor 12 through detection of the magnetic force of the magnet rotor 12 by the hall element 21. This causes no limitation and it is also possible to use a detection coil instead of the hall element and the kick back voltage of 13 and 14 may also be utilized.

As to the current for use in charging the capacitor $C_1$, a constant current is desired to be supplied through the constant circuit 28. However alternatives such as limitations in the maximum amount of current from the resistors or similar devices are acceptable.

As described above, the motor control unit of the present invention having the anti-burning device allows the speed of the motor to be lowered with an increase of the current flowing through the exciting coil when the motor is subjected to a large load. When the speed of the motor is further lowered such that an overcurrent starts flowing through the exciting coil, the condition of the speed of the motor being below the predetermined lower limit is detected by the rotation detection device and the power supply time to the motor is limited according to the speed by the power supply limiting device. Thus, undue heating from an overcurrent can be prevented as well as burning or deterioration of the motor which will shortening of its life.

Thus, since the power supply control device limits the duration of the power supply to the motor when its speed has been detected by the rotation detection device to be below the predetermined lower limit, any overloaded condition can be detected even when motors having different resistances of the exciting coil or being subjected to fluctuations in the amount of current flowing through the exciting coil when the motor is overloaded. Thereby the burning of the motor or similar malfunctions can be prevented.

Meanwhile, when the motor has been locked due to an excessive load, the condition is detected by the rotation detection device. Then, the cyclic power supply device suspends the power supply and after relieving the overload power supply, resumes at the given cycle.

Since there is no risk in continuing the overcurrent flow even if the motor is subjected to an undue load, burning or deterioration of the motor, shortening of its life or the similar malfunctions can be prevented without fail. Moreover, the power supply to the motor is done at the given cycle, so that the motor can be automatically and readily restarted when such a undue load has been relieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor control apparatus for preventing burning, comprising:
   power supply control means including,
      rotational detection means for detecting whether the rotational speed of a motor is below a predetermined value, for outputting a pulse signal having a pulse width which varies depending on a comparison of the detected rotational speed of said motor to said predetermined value, and for detecting when said motor fails to rotate,
      power supply limiting means for limiting current supplied to said motor in response to said pulse signal from said rotational detection means,
      current supply means for charging a capacitor,
      discharging means for discharging said capacitor when the difference between the rotational speed detected by said rotational detection means and a capacitance load of said capacitor is greater than said predetermined value,
      cyclic power supply means for supplying current to said motor for a predetermined cycle before the rotation of said motor is re-initiated for automatically providing a cyclic power supply until said capacitance load exceeds said predetermined value responsive to said rotational detection means detecting that said motor has failed to rotate, and
      power supply discontinuing means for discontinuing the current supplied from said cyclic power supply to said motor when said capacitance load of said capacitor exceeds said predetermined value,
   wherein said cyclic power supply means is arranged for supplying current to said motor at said predetermined cycle responsive to said rotational detection means detecting that said motor has failed to rotate and said power supply limiting means is arranged to limit the current to said motor in response to the rotational speed detected to be below said predetermined value.

2. A motor control apparatus according to claim 1, wherein said power supply limiting means and said cyclic power supply means comprise a capacitor and switching means for charging and discharging said capacitor, limiting the time for supplying current to said motor in response to charging and discharging said capacitor by said switching means in accordance with the rotational speed of said motor when the rotational speed of said motor is detected to be below said predetermined value, and effectuating the supply of current to said motor at said predetermined cycle in response to discharging said capacitor by said switching means when the voltage across said capacitor is greater than a predetermined voltage and charging said capacitor when the voltage across said capacitor is less than said predetermined voltage when said motor fails to rotate.

3. A motor control apparatus according to claim 2, wherein said switching means comprises a plurality of transistors.

4. A power supply control device for preventing burning in a motor control apparatus, comprising:
   rotational detection means for detecting whether the rotational speed of a motor is below a predetermined value and for detecting when said motor fails to rotate;
   power supply limiting means for limiting current to said motor according to the rotational speed of said motor when the rotational speed is detected to be below said predetermined value by said rotational detection means;
   current supply means for charging a capacitor;
   discharging means for discharging said capacitor when the difference between the rotational speed detected by said rotational detection means and a capacitance load of said capacitor is greater than said predetermined value;
   cyclic power supply means for supplying current to said motor for a predetermined cycle before the rotation of said motor is re-initiated for automatically providing a cyclic power supply until said capacitance load exceeds said predetermined value responsive to said rotational detection means detecting that said motor has failed to rotate; and
   power supply discontinuing means for discontinuing current supplied from said cyclic power supply to said motor when said capacitance load of said capacitor exceeds said predetermined value;
   wherein said cyclic power supply means is arranged for supplying current to said motor at said predetermined cycle responsive to said rotational detection means detecting that said motor has failed to rotate and said power supply limiting means is arranged to limit the current to said motor in response to the rotational speed detected to be below said predetermined value.

5. A power supply control device according to claim 4, wherein said power supply limiting means and said cyclic power supply means comprise a capacitor and switching means for charging and discharging said capacitor, limiting the time for supplying current to said motor in response to charging and discharging said capacitor by said switching means in accordance with the rotational speed of said motor when the rotational speed of said motor is detected to be below said predetermined value, and effectuating the supply of current to said motor at said predetermined cycle in response to discharging said capacitor by said switching means when the voltage across said capacitor is greater than a predetermined voltage and charging said capacitor when the voltage across said capacitor is less than said predetermined voltage when said motor fails to rotate.

6. A power supply control device according to claim 5, wherein said switching means comprises a plurality of transistors.

7. A motor control apparatus for preventing burning, comprising:
   a motor having a magnet rotor and first and second exciting coils; and
   power supply control means including,
   rotational detection means for detecting whether the rotational speed of said motor is below a predetermined value and for detecting when said motor fails to rotate and for developing negative logical pulse signals having a cycle corresponding to the rotational cycle of said magnet rotor of said motor,
   power supply limiting means for limiting current to said motor according to the rotational speed of said motor when the rotational speed is detected to be below said predetermined value by said rotational detection means,
   current supply means for charging a capacitor,
   cyclic power supply means for supplying current to said motor for a predetermined cycle before the rotation of said motor is re-initiated for automatically providing a cyclic power supply until a capacitance load of said capacitor exceeds said predetermined value responsive to said rotational detection means detecting that said motor has failed to rotate,
   discharging means for discharging said capacitor when the difference between the rotational speed detected by said rotational detection means and said capacitance load of said capacitor is greater than said predetermined value, and
   power supply discontinuing means for discontinuing the current supplied from the power supply to said exciting coils of said motor when said capacitance load of said capacitor exceeds said predetermined value.

8. A motor control apparatus according to claim 7, wherein said rotational detection means comprises a rotational position detecting device for outputting high level and low level signals in relation to the rotational position of said magnet rotor of the motor, and a pulse generating device for outputting said negative logical pulse signals when the output level of said rotational position detecting device varies between said high and low level signals.

9. A motor control apparatus according to claim 8, wherein said rotational position detecting device comprises a hall element being arranged for detecting the speed of said motor in response to detecting the magnetic force of said magnet rotor of the motor.

10. A motor control apparatus according to claim 8, wherein said rotational position detecting device comprises a detection coil being arranged for detecting the speed of said motor in response to detecting the magnetic force of said magnet rotor of the motor.

11. A motor control apparatus according to claim 8, wherein said rotational position detecting device comprises a voltage detection device being arranged for detecting the speed of said motor in response to detecting the kick-back voltage of the exciting coil of the motor.

12. A motor control apparatus according to claim 8, wherein said pulse generating device comprises a NOT circuit for inverting the level of the output signals from said rotational position detecting device and delaying the output signals by a predetermined amount of time and an OR circuit for developing the logical sum of the output signals from said NOT circuit and said rotational position detecting device.

13. A motor control apparatus according to claim 7, wherein said current supply means comprises a constant current circuit.

14. A motor control apparatus according to claim 7, wherein said current supply means comprises first and second resistors connected in series to the power source.

* * * * *